United States Patent
Rans

(10) Patent No.: US 9,445,539 B2
(45) Date of Patent: Sep. 20, 2016

(54) DUAL BELT SEED DELIVERY MECHANISM

(71) Applicant: AGCO Corporation, Hesston, KS (US)

(72) Inventor: Monte J. Rans, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 4 days.

(21) Appl. No.: 14/631,523

(22) Filed: Feb. 25, 2015

(65) Prior Publication Data

US 2015/0237793 A1    Aug. 27, 2015

Related U.S. Application Data

(60) Provisional application No. 61/944,623, filed on Feb. 26, 2014.

(51) Int. Cl.
*A01C 7/20* (2006.01)
*A01C 7/04* (2006.01)

(52) U.S. Cl.
CPC *A01C 7/20* (2013.01); *A01C 7/046* (2013.01)

(58) Field of Classification Search
CPC ............ A01C 7/08; A01C 7/12; A01C 7/16; A01C 7/20; A01C 7/046
USPC .................................. 111/170, 171, 183–185
See application file for complete search history.

(56) References Cited

U.S. PATENT DOCUMENTS

| | | | | |
|---|---|---|---|---|
| 2,871,805 A * | 2/1959 | Behnen | ..................... | A01C 7/04 111/171 |
| 4,193,523 A * | 3/1980 | Koning | ..................... | A01C 9/08 111/171 |
| 6,681,706 B2 * | 1/2004 | Sauder | ..................... | A01C 7/04 111/171 |
| 8,468,960 B2 * | 6/2013 | Garner | ..................... | A01C 7/20 111/171 |
| 2015/0223392 A1* | 8/2015 | Wilhelmi | ................. | A01C 7/20 111/171 |

* cited by examiner

*Primary Examiner* — John G Weiss

(57) ABSTRACT

A seed delivery mechanism for an agricultural planter that receives seeds from a seed meter of the planter and delivers the seeds to a seed trench as the planter moves in a planting direction has a first endless belt trained about a first drive pulley and a second endless belt trained about a second drive pulley. The first and second drive pulleys rotate the first and second endless belts to provide confronting belt segments that form a seed delivery path between a conveyor entry point and a release point. The first and second endless belts are configured with a downward reach oriented to move seeds predominantly downward and a rearward reach oriented to move the seed predominantly rearward. The rearward reach provides a rearward velocity component to seeds at the release point that offsets a forward velocity of the planter as the planter moves in the planting direction.

5 Claims, 2 Drawing Sheets

DUAL BELT SEED DELIVERY MECHANISM

CROSS REFERENCE TO RELATED APPLICATION

This application claims the benefit of U.S. Provisional Application No. 61/944,623, filed Feb. 26, 2014, which is hereby incorporated by reference in its entirety.

BACKGROUND OF THE INVENTION

1. Field of Invention

This invention relates generally to agricultural seed planters, and more particularly to a mechanism for delivering seed from the seed meter to the open seed trench.

2. Description of Related Art

Modern agricultural planters use seed metering devices designed to select and discharge individual seeds at regular intervals. It is desirable to precisely place the seeds in the seed trench to maximize a field's crop yield. Typically, the seed meters are mounted just below the seed hopper at heights ranging from about eighteen to about twenty-four inches above the ground surface. As a result, planters employing such metering devices also require seed tubes to direct the seeds into the open seed trench after the singulated seeds are discharged from the seed meter.

It has been found that the use of seed tubes to deliver the seeds to the seed trench have a negative effect on the uniformity of seed spacing in the trench. This is due to the fact that some of the seeds descend through the seed tube rapidly, substantially in a free-fall through the entire length of the seed tube, while other seeds contact the walls of the seed tube more frequently as they descend through the seed tube. The differences in velocities at which the seeds exit the seed tube toward the ground have an adverse effect on uniformity of seed spacing in the trench. Additionally, the momentum of the seed caused by the forward motion of the planter causes the seeds to tumble and bounce when introduced into the trench.

As a result, the deposited seeds are not uniformly spaced in the trench or they may bounce from the bottom of the trench. This may lead to the seed being placed shallower than desired. At times, the deposited seed can actually bounce completely out of the trench and lie on top of the ground. Seeds which lie on top of the ground will not germinate.

Thus, there is a need in the agricultural industry for an apparatus and method for controlled delivery of the seed between the seed meter and the open trench that improves seed placement accuracy within the open trench at the desired seed spacing thereby improving crop yield and the efficiency and profitability of farming operations.

OVERVIEW OF THE INVENTION

In one embodiment, the invention is directed to a seed delivery mechanism for an agricultural planter that receives seeds from a seed meter of the planter and delivers the seeds to a seed trench as the planter moves in a planting direction. The seed delivery mechanism includes a first endless belt trained about a first drive pulley, and a second endless belt trained about a second drive pulley. The first and second drive pulleys rotate the first and second endless belts to provide confronting belt segments that form a seed delivery path between a conveyor entry point and a release point. The first and second endless belts are configured with a downward reach oriented to move seeds predominantly downward and a rearward reach oriented to move the seed predominantly rearward. The rearward reach provides a rearward velocity component to seeds at the release point that offsets a forward velocity of the planter as the planter moves in the planting direction.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
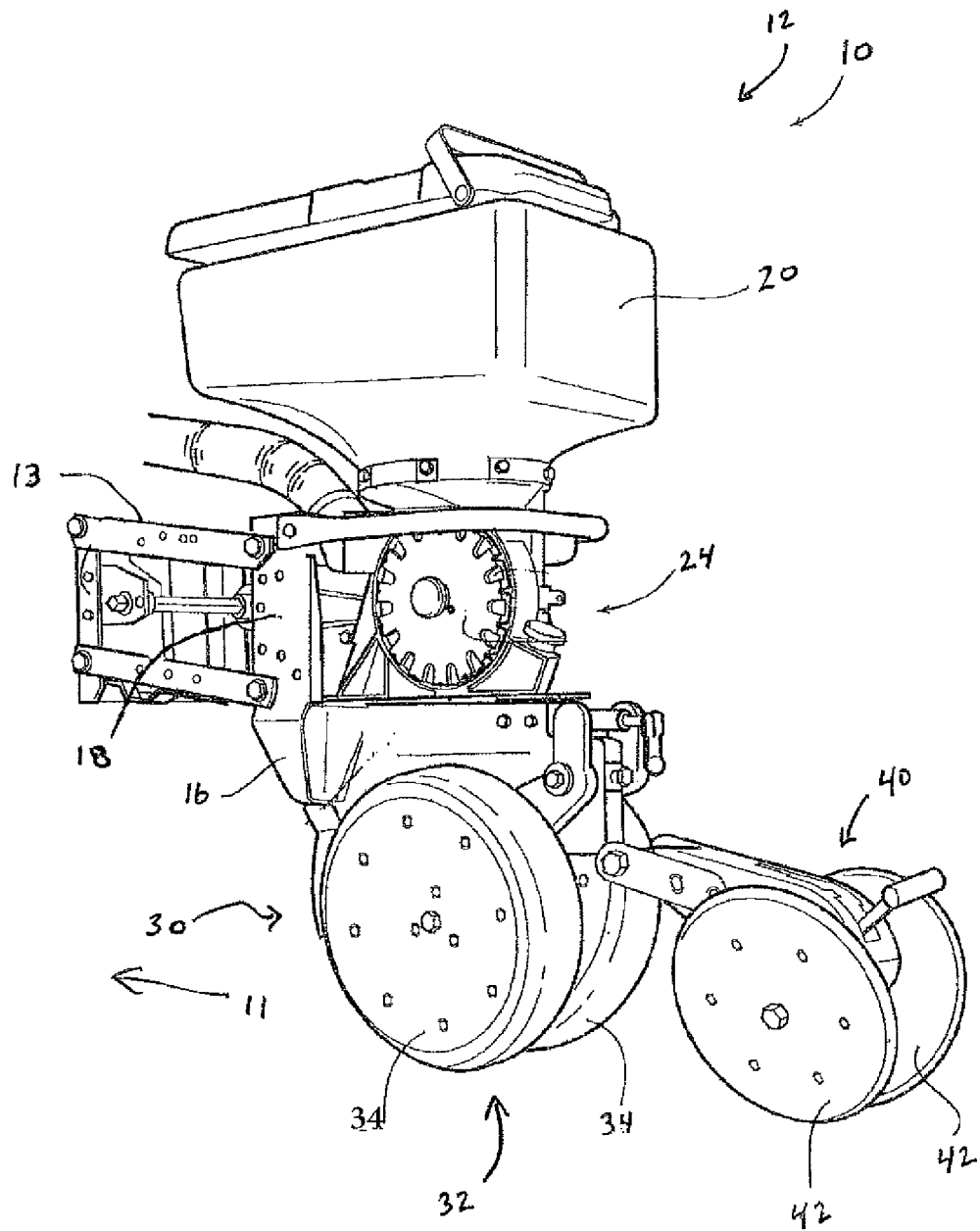
FIG. 1 is a side perspective view of a portion of an agricultural seeding machine.

Referring now to FIG. 1, shown is an example embodiment of a row unit 10 which is part of a typical agricultural planter or seeding machine that is movable across the ground in a planting direction 11. In the embodiment shown, the agricultural seeding machine 12 is in the form of a row crop planter but may also be in the form of a grain drill, etc. As is conventional, the seeding machine 12 includes a mobile main frame 13 (only a portion of which is illustrated in FIG. 1) which is conventionally attached to and towed by a tractor (not shown) with a number of individual row units 10 spaced at intervals along the main frame 13. Each row unit 10 includes a row unit frame 16, vertically adjustable relative to the main frame 13 by a parallel linkage 18. While only one row unit 10 is shown and described herein, the other row units on the seeding machine 12 are understood to be substantially the same. As is conventional, each row unit 10 includes a seed hopper 20 mounted on the row unit frame 16. Each row unit 10 has a seed selection and dispensing device 24, commonly referred to as a seed meter, which receives seeds S from the seed hopper 20 and discharges the seeds S into a seed tube (not shown) at regular intervals. One skilled in the art will understand that there are many different types of seed meters 24 used on seeding machines 12 and any known seed meter 24 for delivering the seed to the seed tube 26 may be used without departing from the scope of the invention.

Frame 16 carries a trench opener assembly 30 and a gauge wheel assembly 32. The trench opener assembly 30 includes a pair of disc opener blades (not visible behind gauge wheel assembly) 33 which are positioned at a predetermined acute angle a relative to each other to cut a trench in the soil as the row unit 10 is advanced in the planting direction 11. Gauge wheel assembly 32 includes a pair of gauge wheels 34. Each gauge wheel 34 is positioned generally in line with and immediately adjacent to the outside of each respective disc opener blade 33 of disc opener assembly 30. Gauge wheel assembly 32 is pivotally coupled with frame 16 and is coupled to the disc opener assembly 30 and vertically adjustable to adjust the vertical position of the disc opener assembly 30 relative to the soil. In such manner, the gauge wheel assembly 32 may be used to adjust the depth of the trench which is cut into the soil using the disc opener assembly 30.

A trench closing assembly 40 includes a pair of closing discs 42 which close the seed trench. Each closing disc 42 is positioned rearward of the disc opener blades and the gauge wheels 34. Each closing disc 42 is rotatable about a corresponding axis of rotation which is positioned rearward of both the disc opener blades and the gauge wheels 34 in the planting direction 11. In regard to the trench opening assembly 30, it should be appreciated that some conventional planters utilize a trench opening assembly having only one trench opening disk, while still other trench opening assemblies utilize a shovel or the like. Thus, reference to the trench opening assembly 30 is intended to include any structure employed to create a trench in the soil. Similarly, reference to the trench closing assembly 40 is intended to include any apparatus employed for replacing the soil over the deposited seeds in the trench.

Figure 2:
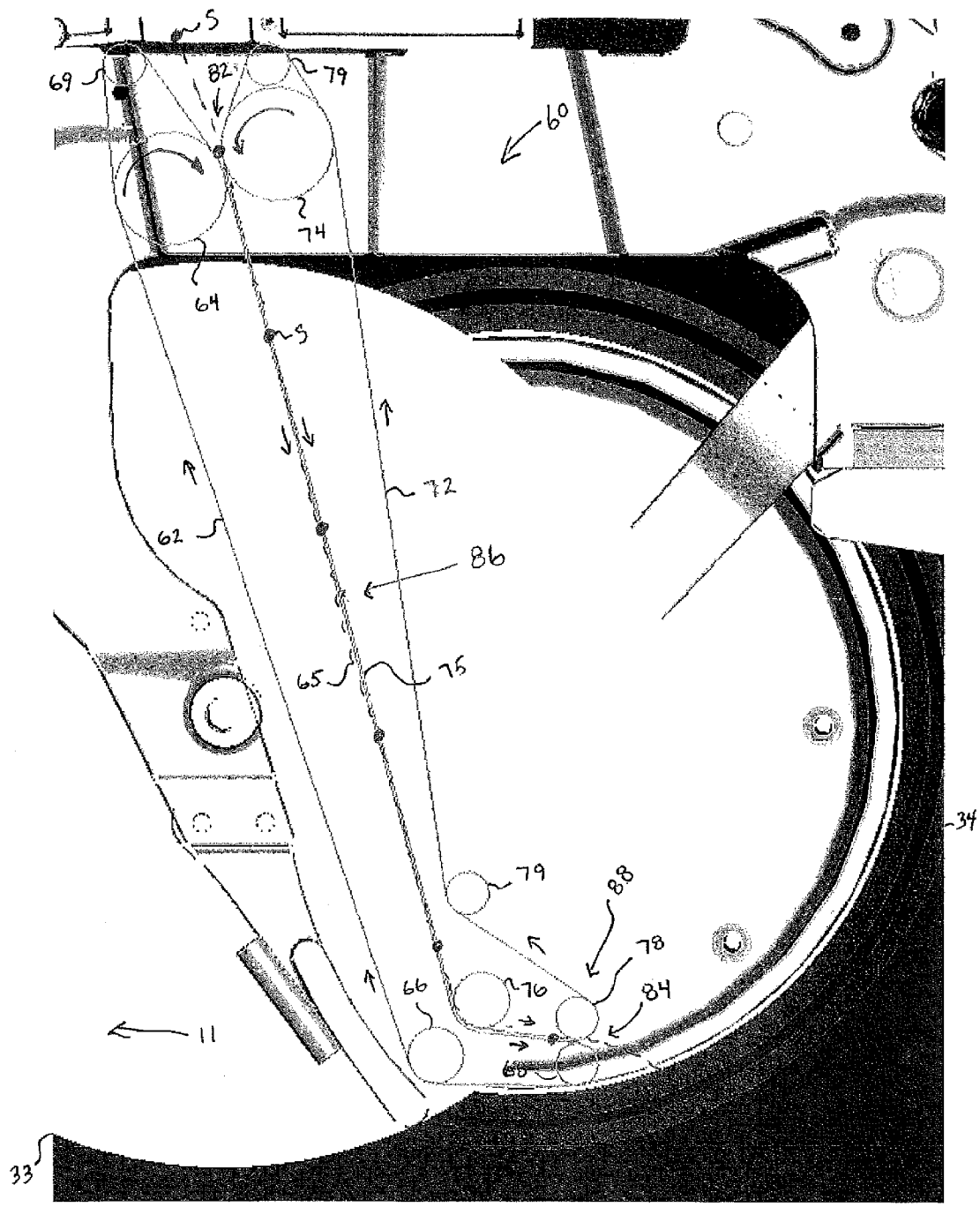
FIG. 2 is a side elevation view of a seed delivery mechanism on the agricultural seeding machine of FIG. 1 according to an embodiment of the invention.

Turning now to FIG. 2, a seed delivery mechanism 60 receives seeds S from the seed meter 24 and delivers the seeds S in a controlled manner to the seed trench. The seed delivery mechanism 60 includes a first endless belt 62 trained about a drive pulley 64 and a second endless belt 72 is trained about a drive pulley 74. The drive pulleys 64, 74 rotate the endless belts 62, 72 in opposing directions as indicated by the arrows and portions of the endless belts 62, 72 are juxtaposed to provide confronting belt segments 65, 75 that form a seed delivery path. Preferably, the drive pulleys 64 and 74 are synchronized such that belts 62 and 72 travel at the same controlled belt speed. Then, as each seed is discharged by the seed meter 24, the discharged seed is captured between the endless belts 62, 72 at a conveyor entry point 82 between the endless belts 62, 72 and conveyed by the seed delivery mechanism 60 toward a release point 84 near the bottom of the trench.

According to the invention, the first and second endless belts 62, 72 of the seed delivery mechanism 60 are configured in a downward reach 86 oriented to move seeds S predominantly downward and a rearward reach 88 oriented to move seeds S predominantly rearward. By predominantly downward, it is meant that the downward reach 86 has more of a vertical component to move the seed in a vertical direction with relation to the ground than a horizontal component that would move the seed in a horizontal direction. Likewise, by predominantly rearward, it is meant that the rearward reach 88 has more of a horizontal component to move the seed in a horizontal direction with relation to the ground than a vertical component to moves the seed in the vertical direction. As seen in the illustrated embodiment, the downward reach 86 may be angled to have some horizontal component and the rearward reach 88 may be angled to have some vertical component. Preferably, the rearward reach 88 is substantially horizontal. However, the angle of the rearward reach 88 can be selected to produce the desired relationship between the seed vertical and horizontal speeds at discharge.

The rearward reach 88 is configured to provide a rearward velocity component to the discharged seed that substantially offsets the forward velocity of the agricultural seeding machine 12 as it moves in the planting direction 11. Desirably, as the seed is propelled from the seed delivery mechanism 60 at the release point 84, it falls to the bottom of the trench with little or no differential speed with respect to the ground in the horizontal direction. It is believed that dropping the seed with the resulting minimal differential speed decreases the propensity of the seed to bounce along the trench and improves the precision of seed placement, especially at higher seeding machine 12 speeds.

In the illustrated embodiment, the first endless belt 62 is trained about drive pulley 64 and an idler pulley 66 at a transition between the upper reach and the lower reach, and an idler pulley 68 near the end of the mechanism 60 at the release point 84. An adjustable tensioning pulley 69 can be mounted adjustably in any known manner for belt tensioning if desired. The second endless belt 72 is trained about drive pulley 74, an idler pulley 76 at the transition between the upper reach and the lower reach, and an idler pulley 78 near the end of the mechanism 60 at the release point 84. Adjustable tensioning pulleys 79 which can be mounted adjustably for belt tensioning if desired. However, one skilled in the art will understand that other pulley arrangements may be used to drive the belts 62, 72 so as to provide a seed delivery path and vertical and horizontal reaches 86, 88 using sound engineering judgment.

Preferably, the drive pulleys 64 and 74 are synchronized such that belts 62 and 72 travel at the same controlled belt speed. Then, as each seed S is discharged by the seed meter 24, the discharged seed is captured between the endless belts 62, 72 at the conveyor entry point 82 between drive pulleys 64, 74 and conveyed downwardly toward the idler pulleys 66 and 76 at the transition. The seed is then conveyed rearwardly toward the idler pulleys 68 and 78 to the release point 84. Confronting belt segments 65, 75 are spaced apart from one another by a transverse distance less than the size (diameter or other suitable measurement) of the seeds S, and are sufficiently flexible to undergo a slight elastic deformation due to each of the seeds S positioned between the belts. Due to the localized deformation, the belts 62, 72 exert an elastic restoring force that acts, along with friction, to fix the seeds S relative to the belts 62, 72 during travel toward the release point 84. In addition, the amount of elastic deformation required can be varied by adjusting the transverse displacement between segments 65, 75 of the belts 62, 72. This later adjustment also enables this conveyor to accommodate a variety of different sizes of seeds S while providing substantially the same amount of elastic deformation between the belts for varying seed sizes.

Desirably, the drive pulleys 64, 74 are operably coupled to an independent drive mechanism (not shown) such that the speed of the belts 62, 72 is independent the speed of rotation of the seed meter 24. For example, the drive pulleys 64, 74 could be operably coupled to an independently driven motor or to the ground wheels of the seeding machine 12. Thus, the speed of the belts 62, 72 can be adjusted to provide a desired rearward velocity to the seeds S to offset the forward velocity of the seeding machine 12. Desirably, the seed delivery mechanism 60 provides a rearward velocity component that is within about 25 percent of the magnitude of the forward velocity of the seeding machine 12, and more desirably within about 10 percent of the magnitude of the forward velocity of the seeding machine.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

The invention claimed is:

1. A seed delivery mechanism for an agricultural planter that receives seeds from a seed meter of the planter and delivers the seeds to a seed trench as the planter moves in a planting direction, the seed delivery mechanism comprising:
a first endless belt trained about a first drive pulley; and
a second endless belt trained about a second drive pulley, the first and second drive pulleys rotating the first and second endless belts to provide confronting belt segments that form a seed delivery path between a conveyor entry point and a release point;
wherein the first and second endless belts comprise a downward reach oriented to move seeds predominantly downward and a rearward reach oriented to move the seed predominantly rearward, and wherein the rearward reach provides a rearward velocity component to seeds at the release point that offsets a forward velocity of the planter as it moves in the planting direction, wherein the downward reach is formed by the first endless belt being trained about the first drive pulley and a first idler pulley and by the second endless belt being trained about the second drive pulley and a second idler pulley, and the rearward reach is formed by the first endless belt being trained about the first idler pulley and a third idler pulley and by the second endless belt being trained about the second idler pulley and a fourth idler pulley, such that the first and second idler pulleys are positioned at a transition between the downward reach and the rearward reach, and the third and fourth idler pulleys are positioned at the release point.

2. The seed delivery mechanism of claim 1 wherein the first and second drive pulleys drive the first and second belts at the same belt speed.

3. The seed delivery mechanism of claim 1 wherein the first and second endless belts are driven at a speed to provide seeds with a rearward velocity component that is within 25 percent of the magnitude of a forward velocity of the planter as the planter moves in the planting direction.

4. The seed delivery mechanism of claim 1 wherein as the seed is propelled from the seed delivery mechanism at the release point, the seed falls to the trench with no differential speed with respect to the ground in the horizontal direction.

5. The seed delivery mechanism of claim 1 wherein the first and second drive pulleys are independent of a speed of rotation of the seed meter.

* * * * *